(12) United States Patent
Pugh et al.

(10) Patent No.: US 9,052,533 B2
(45) Date of Patent: *Jun. 9, 2015

(54) ENERGIZABLE OPHTHALMIC LENS WITH A SMARTPHONE EVENT INDICATOR MECHANISM

(71) Applicant: Johnson & Johnson Vison Care, Inc., Jacksonville, FL (US)

(72) Inventors: Randall Braxton Pugh, St. Johns, FL (US); Adam Toner, Jacksonville, FL (US); Camille A. Higham, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 115 days.

This patent is subject to a terminal disclaimer.

(21) Appl. No.: 13/939,360

(22) Filed: Jul. 11, 2013

(65) Prior Publication Data
US 2015/0015843 A1    Jan. 15, 2015

(51) Int. Cl.
*G06K 7/10* (2006.01)
*G06K 7/14* (2006.01)
*G02C 11/00* (2006.01)
(Continued)

(52) U.S. Cl.
CPC  *G02C 11/10* (2013.01); *G02C 7/04* (2013.01); *H04M 1/7253* (2013.01); *H04M 2250/02* (2013.01); *H04M 19/04* (2013.01); *G02B 27/017* (2013.01)

(58) Field of Classification Search
USPC .............. 235/454, 455, 462, 451, 462.01, 235/462.45, 472.01–472.03
See application file for complete search history.

(56) References Cited

U.S. PATENT DOCUMENTS 5,189,512 A * 2/1993 Cameron et al. .............. 348/838
5,258,785 A * 11/1993 Dawkins, Jr. ................... 351/43

(Continued)

FOREIGN PATENT DOCUMENTS

EP     2412305 A1    2/2012
GB     2497424 A    12/2011

(Continued)

OTHER PUBLICATIONS

Lingley, A., et al, "A Single-Pixel Wireless Contact Lens Display", J. Micromech. Microengineering, vol. 21, No. 12, No. 12, pp. 1-8 (2011).

(Continued)

*Primary Examiner* — Tuyen K Vo (57) ABSTRACT

The present invention is directed to an energizable ophthalmic lens with a smartphone event indicator, wherein the ophthalmic lens may wirelessly receive smartphone event data from a smartphone. The energizable ophthalmic lens may comprise energizable components encapsulated by the soft biocompatible portion or may comprise a media insert that may encapsulate the components. The media insert may be included in ophthalmic lens. The ophthalmic lens may include a verification mechanism, wherein a pairing with a specified smartphone may limit wireless communication to communication between the two specified devices. The receipt of smartphone event data may activate an indicator in the ophthalmic lens. The ophthalmic lens may allow for user response to the notification of the smartphone event. The response may trigger an internal action within the ophthalmic lens, or the ophthalmic lens may transmit response data to the smartphone, triggering an action in the smartphone.

20 Claims, 7 Drawing Sheets

(51) Int. Cl.
   *G02C 7/04*   (2006.01)
   *H04M 1/725*  (2006.01)
   *H04M 19/04*  (2006.01)
   *G02B 27/01*  (2006.01)

(56) References Cited

U.S. PATENT DOCUMENTS

| | | | |
|---|---|---|---|
| 5,281,957 A * | 1/1994 | Schoolman | 345/8 |
| 5,682,210 A | 10/1997 | Weirich | |
| 8,909,311 B2 * | 12/2014 | Ho et al. | 600/318 |
| 2002/0049374 A1 | 4/2002 | Abreu | |
| 2003/0021601 A1 | 1/2003 | Goldstein | |
| 2004/0138539 A1 * | 7/2004 | Jay et al. | 600/322 |
| 2009/0189974 A1 | 7/2009 | Deering | |
| 2009/0244477 A1 | 10/2009 | Pugh et al. | |
| 2011/0221656 A1 | 9/2011 | Haddick et al. | |
| 2012/0194550 A1 | 8/2012 | Osterhout et al. | |
| 2013/0128221 A1 | 5/2013 | Otts et al. | |
| 2014/0081178 A1 | 3/2014 | Letcher et al. | |

FOREIGN PATENT DOCUMENTS

| | | |
|---|---|---|
| WO | WO 2008/109867 A2 | 9/2008 |
| WO | WO 2010/062481 A1 | 6/2010 |

OTHER PUBLICATIONS

European Search Report completed Nov. 4, 2014 for corresponding Application No. EP14176562.

Pandey, J., "A Fully Integrated RF-Powered Contact Lens with A Single Element Display", IEEE Trans. On Biomed. Circ. and Syst. Dec. 2010, vol. 4, No. 6, pp. 454 and 461, ISSN 1932-4545.

Search Report issued by the Intellectual Property Office of Singapore, dated Oct. 30, 2014, for Application No. 10201403622V.

* cited by examiner

Figure 7

ENERGIZABLE OPHTHALMIC LENS WITH A SMARTPHONE EVENT INDICATOR MECHANISM

BACKGROUND OF THE INVENTION

1. Field of the Invention

The present invention describes methods and devices related to an energizable ophthalmic lens with a smartphone event indicator. More specifically, the smartphone event indicator may be activated by a wireless reception of smartphone event data from a specified smartphone. The energizable ophthalmic lens may be capable of transmitting response data back to the smartphone, which may trigger a predefined action in the smartphone.

2. Discussion of the Related Art

Traditionally, an ophthalmic device, such as a contact lens, an intraocular lens, or a punctal plug included a biocompatible device with a corrective, cosmetic, or therapeutic quality. A contact lens, for example, may provide one or more of vision correcting functionality, cosmetic enhancement, and therapeutic effects. Each function is provided by a physical characteristic of the lens. A design incorporating a refractive quality into a lens may provide a vision corrective function. A pigment incorporated into the lens may provide a cosmetic enhancement. An active agent incorporated into a lens may provide a therapeutic functionality, for example, treating glaucoma. Such physical characteristics may be accomplished without the lens entering into an energized state.

More recently, active components have been included in ophthalmic lenses, and the inclusion may involve the incorporation of energizing elements within the ophthalmic device. The relatively complicated components to accomplish this effect may derive improved characteristics by including them in insert devices which are then included with standard or similar materials useful in the fabrication of state of the art ophthalmic lenses.

Also recently, smartphones have become increasingly prevalent. The popularity of smartphones has prompted a surge in the demand for mobile applications, accessories, and devices that interact with the smartphones. Many mobile accessories utilize wireless communication between the smartphone and the mobile accessory. Wireless communication allows for effective interaction without the inconvenience of wired attachment to the smartphone. Frequently, mobile accessories, such as Bluetooth headsets, are modified embodiments of devices familiar to consumers. Such familiarity allows for ease of use without requiring extensive instruction.

It may be desirable to improve the process, methods, and resulting devices for realizing ophthalmic lenses with smartphone event indicators of various kinds. It may be anticipated that some of the solutions for smartphone event indicators in energizable ophthalmic lenses may provide novel aspects for non-energized devices and other biomedical devices. Accordingly, novel methods and devices relating to wireless communication capabilities with a smartphone in an ophthalmic lens are therefore desired.

SUMMARY OF THE INVENTION

The methods and devices for wireless communication between communication devices and powered or energized ophthalmic lenses in accordance with the present invention overcomes the disadvantages and/or limitations associated with the prior art as briefly described above.

In accordance with one aspect, the present invention is directed to an energizable ophthalmic lens capable of notifying a user of a smartphone event. The energizable ophthalmic lens comprises a notification mechanism capable of notifying the user of the smartphone event, when the notification mechanism is capable of providing a first functionality to the energizable ophthalmic lens, a receiver capable of wirelessly receiving smartphone event data from a predefined source smartphone, wherein the receiver is in electrical communication with the notification mechanism, conductive traces capable of electrically connecting the notification mechanism and the receiver, and a soft lens portion capable of encapsulating the notification mechanism and the receiver.

The methods and devices of the present invention provides a means for cost effective communication between an energizable ophthalmic lens and a device such as a smartphone. As more devices, for example, a smartphone, are widely utilized, the present invention is simple to learn and generate for the average individual.

BRIEF DESCRIPTION OF THE DRAWINGS

The foregoing and other features and advantages of the invention will be apparent from the following, more particular description of preferred embodiments of the invention, as illustrated in the accompanying drawings.

DETAILED DESCRIPTION OF THE PREFERRED EMBODIMENTS

The present invention describes an energizable ophthalmic lens with a smartphone event indicator that may be activated through wireless communication with a smartphone. In general, according to some exemplary embodiments of the present invention, a smartphone event indicator may be operatively associated with an energizable ophthalmic lens, such as those that include a media insert. In some exemplary embodiments, the smartphone event indicator may be activated when the energizable ophthalmic lens wirelessly receives smartphone event data from a smartphone. In such exemplary embodiments, the energizable ophthalmic lens may also be capable of transmitting response data back to the smartphone, wherein the response data may trigger a specified action in the smartphone.

In the following sections, detailed descriptions of exemplary embodiments of the present invention are given. The description of both preferred and alternate embodiments are exemplary embodiments only, and it is understood that to those skilled in the art that variations, modifications, and alterations may be apparent. It is therefore to be understood that the exemplary embodiments do not limit the scope of the underlying invention.

GLOSSARY

In the description and claims directed to the presented invention, various terms may be used for which the following definitions will apply:

As used herein, Back Curve Piece or Back Insert Piece refers to a solid element of a multi-piece insert that, when assembled into the insert, will occupy a location on the side of the ophthalmic lens that is on the back. In an ophthalmic device, such a piece would be located on the side of the insert that would be closer to the wearer's eye surface. In some exemplary embodiments, the back curve piece may include a region in the center of an ophthalmic device through which light may proceed into the wearer's eye. This region may be called an optical zone. In other exemplary embodiments, the piece may take an annular shape where it does not include some or all of the regions in the optical zone. In some exemplary embodiments of an ophthalmic insert, there may be multiple back curve pieces, and one of them may include the optical zone, while others may be annular or portions of an annulus.

As used herein, Component refers to a device capable of drawing electrical current from an energy source to perform one or more of a change of logical state or physical state.

As used herein, Deposit refers to any application of material, including, for example, a coating or a film.

As used herein, Electrical Communication refers to being influenced by an electrical field. In the case of conductive materials, the influence may result from or in the flow of electrical current. In other materials, it may be an electrical potential field that causes an influence, such as the tendency to orient permanent and induced molecular dipoles along field lines as an example.

As used herein, Encapsulate refers to creating a barrier to separate an entity, for example, a media insert, from an environment adjacent to the entity.

As used herein, Encapsulant refers to a layer formed surrounding an entity, for example, a media insert, that creates a barrier to separate the entity from an environment adjacent to the entity. Exemplary encapsulants comprise silicone hydrogels, such as Etafilcon, Galyfilcon, Narafilcon, and Senofilcon, or other hydrogel contact lens material. In some exemplary embodiments, an encapsulant may be semipermeable to contain specified substances within the entity and preventing specified substances, such as, water, from entering the entity.

As used herein, Energized refers to the state of being able to supply electrical current to or to have electrical energy stored within.

As used herein, Energized Orientation refers to the orientation of the molecules of a liquid crystal when influenced by an effect of a potential field powered by an energy source. For example, a device comprising liquid crystals may have one energized orientation if the energy source operates as either on or off. In other exemplary embodiments, the energized orientation may change along a scale affected by the amount of energy applied.

As used herein, Energy refers to the capacity of a physical system to do work. Many uses within the present invention may relate to the capacity of being able to perform electrical actions in doing work.

As used herein, Energy Harvesters refers to devices capable of extracting energy from the environment and converting it to electrical energy.

As used herein, Energy Source refers to any device or layer that is capable of supplying energy or placing a logical or electrical device in energized state.

As used herein, Event refers to a defined set of parameters, such as, for example, a biomarker level, energization level, pH level, or a visual recognition of a particular object. An event may be specific to a wearer, such as a level of medication, or may be generally applicable to all wearers, such as temperature.

As used herein, Front Curve Piece or Front Insert Piece refers to a solid element of a multi-piece rigid insert or media insert that, when assembled into the insert, will occupy a location on the side of the ophthalmic lens that is on the front. In an ophthalmic device, such a piece would be located on the side of the insert that would be further from the wearer's eye surface. In some exemplary embodiments, the piece may include a region in the center of an ophthalmic device through which light may proceed into the wearer's eye. This region may be called the optical zone. In other exemplary embodiments, the piece may take an annular shape where it does not include some or all of the regions in the optical zone. In some exemplary embodiments of an ophthalmic insert, there may be multiple front curve pieces, and one of them may include the optical zone, while others may be annular or portions of an annulus.

As used herein, Functionalized refers to making a layer or device able to perform a function including for example, energization, activation, or control.

As used herein, Insert Piece refers to a solid element of a multi-piece rigid insert or media insert that may be assembled into the rigid insert or media insert. In an ophthalmic device, an insert piece may include a region in the center of an ophthalmic device through which light may proceed into the user's eye. This region may be called an optic zone. In other exemplary embodiments, the piece may take an annular shape where it does not include some or all of the regions in the optical zone. In some exemplary embodiments, a rigid insert or media insert may comprise multiple insert pieces, wherein some insert pieces may include the optic zone and other insert pieces may be annular or portions of an annulus.

As used herein, Ophthalmic Lens or Ophthalmic Device or lens refers to any device that resides in or on the eye. The device may provide optical correction, may be cosmetic, or provide some functionality unrelated to optic quality. For example, the term lens may refer to a contact lens, intraocular lens, overlay lens, ocular insert, optical insert, or other similar device through which vision is corrected or modified, or through which eye physiology is cosmetically enhanced (e.g. iris color) without impeding vision. Alternately, lens may refer to a device that may be placed on the eye with a function other than vision correction, for example, monitoring of a constituent of tear fluid or means of administering an active agent. In some embodiments, the preferred lenses of the invention may be soft contact lenses that are made from silicone elastomers or hydrogels, which may include, for example, silicone hydrogels and fluorohydrogels.

As used herein, Lens-Forming Mixture or Reactive Mixture or RMM refers to a monomeric composition and/or prepolymer material that may be cured and cross-linked or cross-linked to form an ophthalmic lens. Various exemplary embodiments may include lens-forming mixtures with one or more additives such as UV blockers, tints, diluents, photoinitiators, or catalysts, and other additives that may be useful in an ophthalmic lenses such as, contact or intraocular lenses.

As used herein, Lens-Forming Surface refers to a surface that may be used to mold a lens. In some exemplary embodiments, any such surface may have an optical quality surface finish, which indicates that it is sufficiently smooth and formed so that a lens surface fashioned by the polymerization of a lens forming material in contact with the molding surface is optically acceptable. Further, in some exemplary embodiments, the lens-forming surface may have a geometry that may be necessary to impart to the lens surface the desired optical characteristics, including, for example, spherical, aspherical and cylinder power, wave front aberration correction, and corneal topography correction.

As used herein, Liquid Crystal refers to a state of matter having properties between a conventional liquid and a solid crystal. A liquid crystal cannot be characterized as a solid but its molecules exhibit some degree of alignment. As used herein, a liquid crystal is not limited to a particular phase or structure, but a liquid crystal may have a specific resting orientation. The orientation and phases of a liquid crystal may be manipulated by external forces, for example, temperature, magnetism, or electricity, depending on the class of liquid crystal.

As used herein, Media Insert refers to an encapsulated insert that will be included in an energized ophthalmic device. The energization elements and circuitry may be embedded in the media insert. The media insert defines the primary purpose of the energized ophthalmic device. For example, in exemplary embodiments where the energized ophthalmic device allows the user to adjust the optic power, the media insert may include energization elements that control a liquid meniscus portion in the optical zone. Alternately, a media insert may be annular so that the optical zone is void of material. In such exemplary embodiments, the energized function of the lens may not be optic quality but may be, for example, monitoring glucose or administering medicine.

As used herein, Mold refers to a rigid or semi-rigid object that may be used to form lenses from uncured formulations. Some preferred molds include two mold parts forming a front curve mold part and a back curve mold part, each mold part having at least one acceptable lens-forming surface.

As used herein, Optic Zone refers to an area of an ophthalmic lens through which a user of the ophthalmic lens sees.

As used herein, Pairing refers to an action that allows a specified smartphone to recognize a specific energizable ophthalmic lens. A pairing may prevent an energizable ophthalmic lens from unintentionally communicating with an unpaired smartphone, or a pairing may ensure communication between the energizable ophthalmic lens and the intended smartphone. Pairing may occur on eye or prior to use or, in some aspects, may comprise a multistep process occurring both on eye and prior to use. Pairing techniques may include, for example, Bluetooth profile synchronization or radio frequency identification interrogation and response.

As used herein, Precure refers to a process that partially cures a mixture. In some exemplary embodiments, a precuring process may comprise a shortened period of the full curing process. Alternately, the precuring process may comprise a unique process, for example, by exposing the mixture to different temperatures and wavelengths of light than may be used to fully cure the material.

As used herein, Predose refers to the initial deposition of material in a quantity that is less than the full amount that may be necessary for the completion of the process. For example, a predose may include a quarter of the necessary substance.

As used herein, Postdose refers to a deposition of material in the remaining quantity after the predose that may be necessary for the completion of the process. For example, where the predose includes a quarter of the necessary substance, a subsequent postdose may provide the remaining three quarters of the substance.

As used herein, Power refers to work done or energy transferred per unit of time.

As used herein, Rechargeable or Re-energizable refers to a capability of being restored to a state with higher capacity to do work. Many uses within the present invention may relate to the capability of being restored with the ability to flow electrical current at a certain rate for certain, reestablished time periods.

As used herein, Reenergize or Recharge refers to restoring to a state with higher capacity to do work. Many uses within the present invention may relate to restoring a device to the capability to flow electrical current at a certain rate for certain, reestablished time periods.

As used herein, Released or Released from a Mold refers to a lens that is either completely separated from the mold or is only loosely attached so that it may be removed with mild agitation or pushed off with a swab.

As used herein, Rigid Insert refers to an insert that maintains a predefined topography. When included in a contact lens, the rigid insert may contribute to the functionality and/or modulus of the lens. For example, varying topography of or densities within the rigid insert may define zones, which may correct vision in users with astigmatism. The rigid insert may be flexible to allow for placement and removal of the ophthalmic lens on the eye.

As used herein, Smartphone refers to a mobile phone built on a mobile operating system. Generally, a smartphone may have more advanced processing capabilities than a feature phone.

As used herein, Stabilizing Feature refers to a physical characteristic that stabilizes an ophthalmic device to a specific orientation on the eye, when the ophthalmic device is placed on the eye. In some exemplary embodiments, the stabilizing feature may add sufficient mass to ballast the ophthalmic device. In some exemplary embodiments, the stabilizing feature may alter the front curve surface, wherein the eyelid may catch the stabilizing feature and the user may reorient the lens by blinking. Such exemplary embodiments may be enhanced by including stabilizing features that may add mass. In some exemplary embodiments, stabilizing features may be a separate material from the encapsulating biocompatible material, may be an insert formed separately from the molding process, or may be included in the rigid insert or media insert.

As used herein, Substrate Insert refers to a formable or rigid substrate that may be capable of supporting an energy source and may be placed on or within an ophthalmic lens. In some embodiments, the substrate insert also supports one or more components.

As used herein, Three-dimensional Surface or Three-dimensional Substrate refers to any surface or substrate that has been three-dimensionally formed where the topography is designed for a specific purpose, in contrast to a planar surface.

As used herein, Trace refers to a battery component capable of electrically connecting the circuit components. For example, circuit traces may include copper or gold when the substrate is a printed circuit board and may be copper, gold, or printed deposit in a flex circuit. Traces may also comprise nonmetallic materials, chemicals, or mixtures thereof.

As used herein, Variable Optic refers to the capacity to change an optical quality, for example, the optical power of a lens or the polarizing angle.

Ophthalmic Lens

Figure 1:
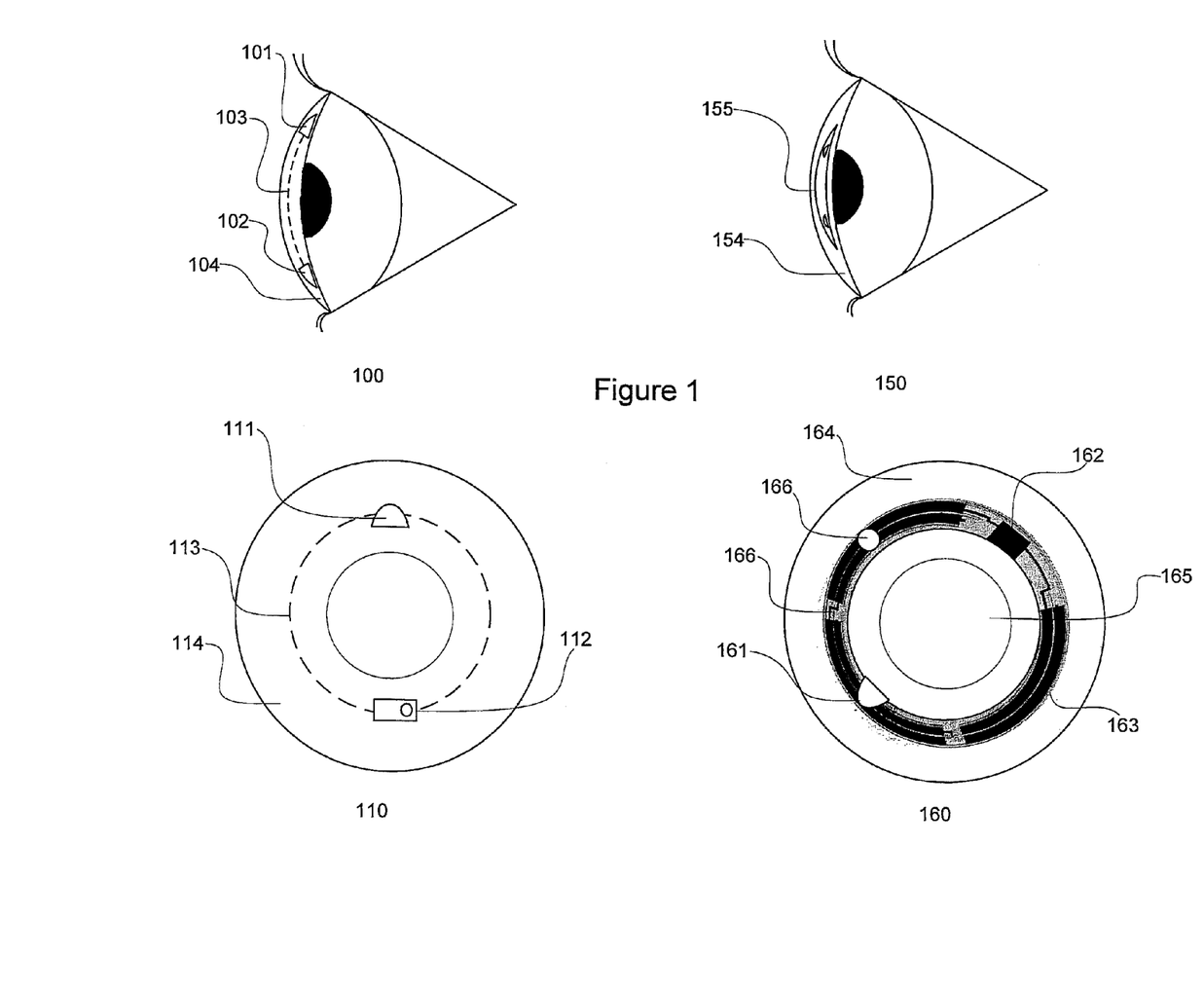
FIG. 1 illustrates exemplary embodiments of an energizable ophthalmic lens with a smartphone event indicator, wherein the energizable ophthalmic lens may be capable of wirelessly receiving event data from a smartphone.

Referring to FIG. 1, exemplary embodiments of an energizable ophthalmic lens 110, 160 with wireless communication capabilities with a smartphone is illustrated on an eye 100, 150. In some exemplary embodiments, an ophthalmic lens 110 may comprise a soft biocompatible portion 114, a processor with a receiver 112, a notification mechanism 111, and conductive traces 113. In certain exemplary embodiments, the ophthalmic lens 110 may not comprise a power source, and the ophthalmic lens 110 may be powered through a wireless energy transmission mechanism. For example, placing the ophthalmic lens 110 in a specified proximity to a smartphone may charge the sensor and the notification mechanism. Alternately, when the smartphone event occurs, the smartphone may wirelessly power the notification mechanism.

The components 111-113 may not be encapsulated in a media insert, and the soft biocompatible portion 114 may be in direct contact with the components 111-113. In such exemplary embodiments, the soft biocompatible portion 114 may encapsulate the components 111-113. The encapsulation may suspend them 111-113 at a specific depth within the ophthalmic lens 110. Alternately, the components 111-113 may be included on a substrate insert. The substrate insert may be formed and the components 111-113 may be placed on the substrate prior to the addition of the soft biocompatible portion 114.

An alternate exemplary embodiment of a media insert 155 for an energized ophthalmic device 154 on an eye and a corresponding energized ophthalmic device 160 are illustrated. The media insert 155 may comprise an optic zone 165 that may or may not provide a second functionality, including, for example, vision correction. Where the energized function of the ophthalmic device is unrelated to vision, the optic zone 165 of the media insert 155 may be void of material. In some exemplary embodiments, the media insert 155 may include a portion not in the optical zone 165 comprising a substrate incorporated with energizing elements, such as a power source 163, and electronic components, such as a processor 162.

In some exemplary embodiments, the power source 163, comprising, for example, a battery, and a processor 162, including, a semiconductor die, may be attached to the substrate. In some such aspects, conductive traces 166 may electrically interconnect the electronic components 162, 161 and the energization elements 163.

In some exemplary embodiments, the processor 162 may be programmed to establish the parameters of the functionality of the ophthalmic lens 160. For example, where the ophthalmic lens 160 comprises a variable optic portion in the optical zone 120, the processor may be programmed to set the energized optical power. Such an embodiment may allow for mass production of media inserts that have the same composition but include uniquely programmed processors.

The processor may be programmed before the encapsulation of the electrical components 161-163, 165, 166 within the media insert 155. Alternately, the processor 162 may be programmed wirelessly after encapsulation. Wireless programming may allow for customization after the manufacturing process, for example, through a programming apparatus.

In some exemplary embodiments, the media insert 155 may further comprise a receiver 161, which may sense and wirelessly receive event data from a smartphone. The receiver 161 may be in electrical communication, such as through the conductive traces 166, with the processor 162 and the power source 163.

For illustrative purposes, the media insert 155 is shown in an annular embodiment, which may not include a portion in the optical zone 165. However, where a functionality of the media insert 155 may be related to vision, the media insert 155 may include an energizable element within the optical zone 165. For example, the media insert 155 may comprise a variable optic portion, wherein the media insert 155 may provide multiple powers of vision correction based on different energization levels.

The media insert 155 may be fully encapsulated to protect and contain the energization elements 163, traces 166, and electronic components 162. In some exemplary embodiments, the encapsulating material may be semi-permeable, for example, to prevent specific substances, such as water, from entering the media insert 155 and to allow specific substances, such as ambient gasses or the byproducts of reactions within energization elements, to penetrate or escape from the media insert 155.

In some exemplary embodiments, the media insert 155 may be included in an ophthalmic device 160, which may comprise a polymeric biocompatible material. The ophthalmic device 160 may include a rigid center, soft skirt design wherein a central rigid optical element comprises the media insert 155. In some specific exemplary embodiments, the media insert 150 may be in direct contact with the atmosphere and the corneal surface on respective anterior and posterior surfaces, or alternately, the media insert 155 may be encapsulated in the ophthalmic device 160. The periphery 164 of the ophthalmic device 160 may be a soft skirt material, including, for example, a polymerized reactive monomer mixture, such as a hydrogel material.

Figure 2:
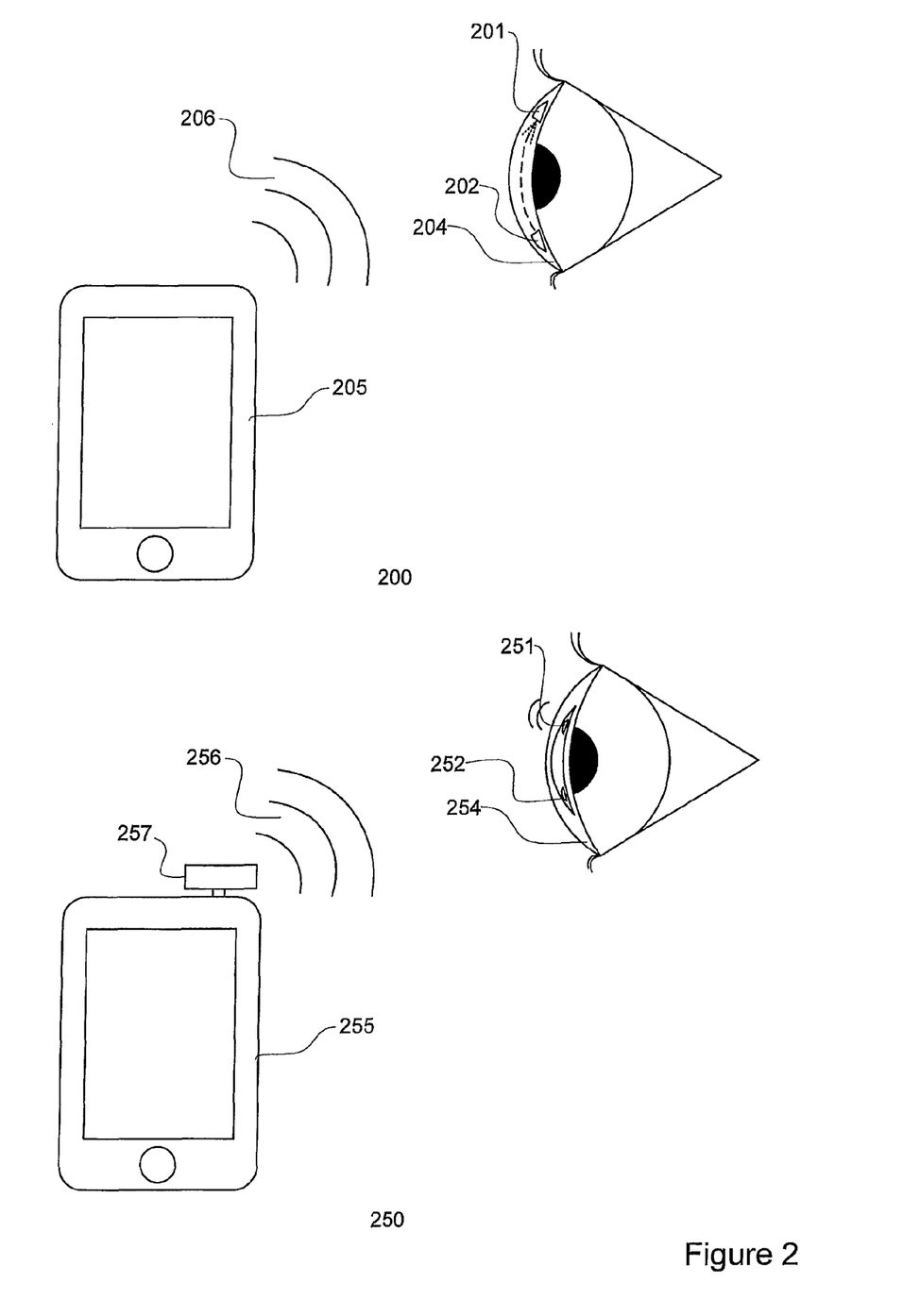
FIG. 2 illustrates an exemplary embodiment of a wireless communication from a smartphone to an energizable ophthalmic lens on an eye, wherein the energizable ophthalmic lens may be capable of wirelessly receiving event data from a smartphone.

Referring to FIG. 2, exemplary embodiments of wireless communication from a smartphone to an energizable ophthalmic lens on an eye are illustrated. In some exemplary embodiments 200, a smartphone 205 may transmit event data 206, based on the occurrence of a predefined smartphone event, to a receiver 202 on the ophthalmic lens 204. The transmitted event data 206 may trigger an activation of the notification mechanism 201. For example, as shown, the notification mechanism may comprise a light source, wherein the event 206 prompts illumination. In such exemplary embodiments, the light source may be directed at the eye. Alternately, the light source may be directed into the ophthalmic lens 204, wherein the ophthalmic lens 204 may reflect or disperse the light. An indirectly visible light may soften the light to a glow, which may be less jarring visually.

In some alternate exemplary embodiments of the system 250, the smartphone 255 may include a transmission adapter 257, which may allow the smartphone 255 to wirelessly transmit the smartphone event data 256 to the receiver 252. The receipt of the smartphone event data 256 may activate a vibration notification mechanism 251. The notification mechanism 251 may comprise a vibration generation device for providing mechanical movement, including, for example, a piezoelectric device.

Such a mechanism may be more jarring than a light source. Accordingly, a vibration generation embodiment may be preferable where the event 256 may require an affirmative action, such as blink recognition of the notification. Some exemplary embodiments may include multiple notification types. For example, the default notification may be a flashing light, and the user may assign the vibration notification to a specific event, including, for example, a phone call or text message from a specific contact or appointment reminders.

In still further exemplary embodiments, the notification mechanism 251 may comprise a sound generation device, wherein the sound may be audible to the user, such as, for example, through bone conduction. The sound may be audible based on the proximity of the eye to the skull through the eye socket, wherein the bones of the skull may direct the sound to the cochlea. In some such aspects, the sound generation device may comprise a transducer, wherein the transducer may convert the wirelessly received data to an acoustic output.

The sound may be determined by the notification mechanism, wherein smartphone event data may trigger a preprogrammed sound, such as a beep. Alternately, the smartphone event data may include the specific ringtone or sound associated with that smartphone event. In such exemplary embodiments, the notification mechanism may generate the specific ringtone or sound, allowing the user to discern between callers or events, even while the smartphone may be on a silent setting.

For illustrative purposes, in the exemplary embodiment where the notification mechanism 201 comprises a light source, the energizable elements 201-203 are shown as components separately encapsulated in the ophthalmic lens 204. In the alternate exemplary embodiments where the notification mechanism 251 comprises a vibration alert, the energizable elements 251, 252 are shown as components of a media insert 253. However, variations in notification mechanisms may not be limited to the illustrated embodiments, other exemplary embodiments may be practical and should be considered within the scope of the inventive art.

The smartphone and the ophthalmic lens may comprise complementary communication protocols enabling the two devices to wirelessly communicate. In some exemplary embodiments, the communication protocol may comprise a non-typical technology for a smartphone, including, for example, infrared, and the functioning may rely on proximity, which may limit inadvertent wireless communication with unintended smartphones. In such exemplary embodiments, the non-typical technology may be specifically equipped on the smartphone through additional hardware, including, for example, a transmission adapter 257.

As an illustrative example, the transmission adapter 257 may allow the smartphone 255 to transmit the smartphone event data 256 through an infrared transmission to the receiver 252. Prior to use, the transmission adapter 257 may be paired with the specific ophthalmic lens 204/254, for example, where the transmission adapter is calibrated to specific infrared wavelengths or pulse patterns.

Other aspects may allow pairing between the ophthalmic lens and the smartphone through technology typically included in a standard smartphone, such as, for example, Bluetooth technology. Unlike infrared, Bluetooth technology is relatively common in smartphones, and synchronization may not require additional hardware.

The communication protocol may comprise a low power embodiment, including, for example, ANT or ZigBee technology. This may allow the ophthalmic lens to periodically sample the environment for the smartphone event data transmission from the smartphone while also limiting the power loss from the sampling. Low power wireless protocol may generally extend the potential energizable duration of the ophthalmic lens. Complementary wireless protocol profiles may limit the ophthalmic lens to receive transmissions from the intended smartphone.

In some exemplary embodiments, the pairing may occur prior to use. For example, the ophthalmic lens may be preprogrammed to interact with a specific smartphone, such as through use of application software that may be downloaded onto the intended smartphone. In other such embodiments, the ophthalmic lens may include a serial authentication code or electronic pedigree (e-pedigree), which may be unique to a particular ophthalmic lens or an ophthalmic lens pack. The unique code identifying the ophthalmic lens may vary depending on the serialization methods associated with the brand or line of ophthalmic lenses.

The smartphone may be programmed to recognize a specific serial code. In some exemplary embodiments, the user may program the smartphone utilizing capture technology to scan or photograph a stock keeping unit (SKU) barcode or quick response (QR) bar code, which may be associated with the authentication serial number. In some such aspects, the SKU or QR barcode may be located on the packaging of the ophthalmic lens, for example, on the individual blister package or on the box for multiple blisters packages, or other common packaging techniques. Initiating the pairing through interaction with the packaging may be preferable over direct interaction with the ophthalmic lens as a means to reduce contamination of or damage to the ophthalmic lens or the eye.

In some exemplary embodiments, the scanned code may specify the identifying attribute of the ophthalmic lens. The identification may allow the smartphone to communicate specifically with the intended ophthalmic lens. For example, the scanned code may include the authentication code, the Bluetooth profile, infrared wavelength, or infrared signal pattern, depending on the wireless communication technology.

Prior to a communication between the ophthalmic lens and a smartphone, the two devices may trade or recognize the serial authorization or e-pedigree, for example, through use of a radio frequency identification system. In some exemplary embodiments, a smartphone event may trigger the smartphone to transmit an identification or authorization interrogation to the ophthalmic lens. The interrogation may include all, part, or none of the authorization code. For example, the smartphone may transmit the entire code, and, where the code matches the serial code of the ophthalmic lens, the lens may transmit a response, which may include the serial code or recognition of the correct serial code.

Alternately, the interrogation may include a portion of the serial code, and the ophthalmic lens may respond with the remaining portion. A successful string may permit further wireless communication. In still further alternate exemplary embodiments, the interrogation may not transmit any portion of the serial code but may prompt the ophthalmic lens to transmit the entire code. Where the smartphone verifies the serial code, wireless communication may continue, and where the serial code does not match, wireless communication may be terminated.

In some exemplary embodiments, the pairing may occur entirely on eye, wherein a user or smartphone operator may place the smartphone in proximity to the ophthalmic lens. Utilizing a software application, including, for example, a downloadable mobile application or standard wireless software installed during manufacturing, the user may prompt the smartphone to scan for the wireless profile or protocol of the ophthalmic lens. Such an initial scan may pair the smartphone to the ophthalmic lens, for example, through infrared or Bluetooth technology. Future wireless communication may occur where the smartphone verifies the identity of the ophthalmic lens based on the pairing.

As an illustrative example, radio frequency identification (RFID) may be utilized as a means to verify the identity of the ophthalmic lens. Verification through RFID may not require the smartphone to be in the line of the sight of the ophthalmic lens. Such exemplary embodiments may limit wireless communication to a specific range but not necessarily to a specific location. For example, the smartphone may be located in a bag or pocket, and wireless communication may still occur when the smartphone is within range.

An RFID system may also allow for low power requirements for identification exchange based on the type of tag and reader. In some exemplary embodiments, the ophthalmic lens may include a passive tag, wherein the ophthalmic lens may reply to interrogations from an active reader in the smartphone. Such an embodiment may conserve power within the ophthalmic lens. In some such aspects, the interrogation may prompt the ophthalmic lens to begin sampling the defined environment for the smartphone event data. The ophthalmic lens may be inactive prior to the interrogation, and the sampling may be deactivated after a specified amount of time to conserve energy, for example, when the authentication code is not verified.

Figure 3:
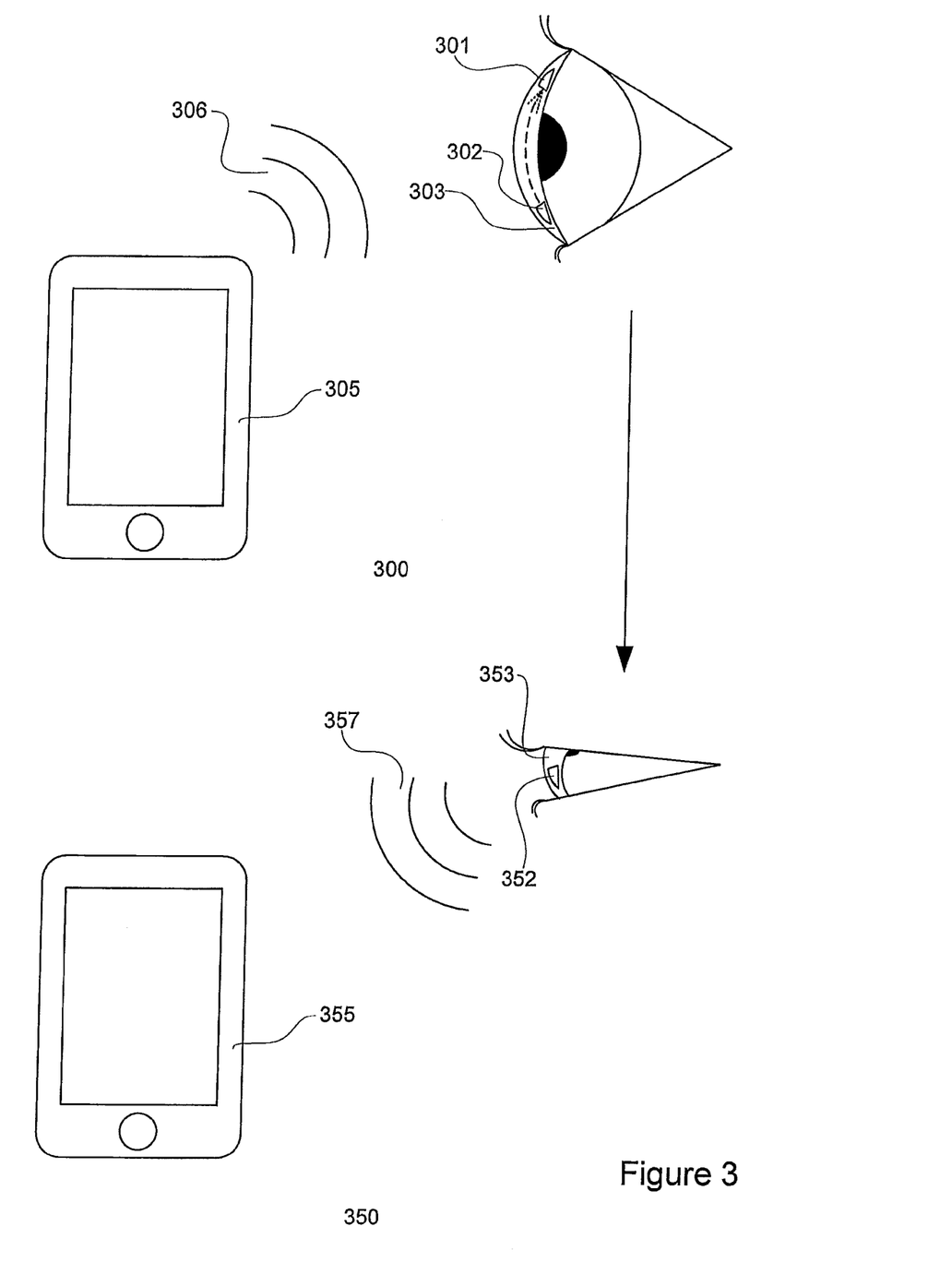
FIG. 3 illustrates an exemplary embodiment of a wireless communication between a smartphone to an energizable ophthalmic lens on an eye, wherein the energizable ophthalmic lens may be capable of wirelessly receiving event data from a smartphone and wirelessly transmitting response data to the smartphone.

Referring now to FIG. 3, exemplary embodiments of wireless communication and control between a smartphone to an energizable ophthalmic lens on an eye are illustrated. In some embodiments, an ophthalmic lens 303 may comprise a receiver 302 capable of receiving the smartphone event data 306 and a notification mechanism 301 capable of notifying the user of the event. In a receiving step 300, a smartphone 305 may wirelessly transmit the data 306 to the receiver 302.

In some exemplary embodiments, the ophthalmic lens 353 may further comprise a transmitter 352, which may be located in a similar position within the ophthalmic lens 353 as the receiver 302. In a transmitting step 350, the transmitter 352 may send response data 357 back to the smartphone 355. The response data 357 may trigger an action in the smartphone, including, for example, silencing a ringtone.

In some such embodiments, a verification step, similar to that described with respect to FIG. 2, may be preferable to confirm that the wireless communication is between the designated ophthalmic lens 353 and smartphone 355. The verification step may occur immediately before the transmission of the response data 3557, which may limit misdirected response cues. In other exemplary embodiments, the wireless communication may be continuous throughout the occurrence of the smartphone event, after the initial transmission of the smartphone event data 306. Where the wireless communication is continuous, a second verification process may not be necessary to ensure the intended wireless communication.

Figure 4:
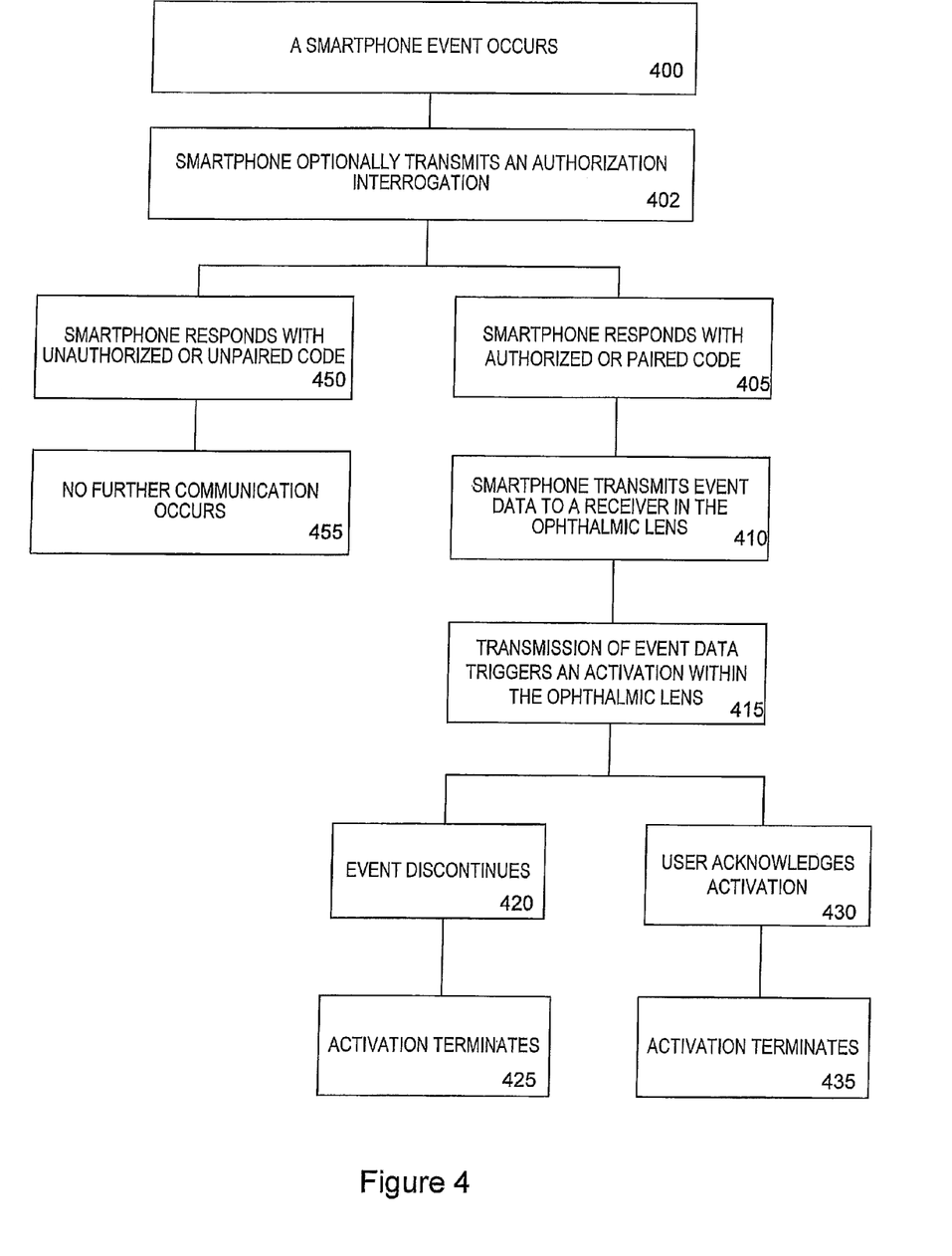
FIG. 4 illustrates an exemplary process flowchart for smartphone event notification, wherein the energizable ophthalmic lens may be capable of wirelessly receiving event data from a smartphone.

Referring to FIG. 4, an exemplary flowchart is illustrated. At 400, a predefined smartphone event may occur. The predefined event may include, for example, a phone call, a calendar appointment, or an email. In some exemplary embodiments, at 402, the smartphone may transmit an authorization interrogation, such as, described in FIG. 2, to the ophthalmic lens, which may respond with an authorization code. In some exemplary embodiments, at 450, the ophthalmic lens may respond with an unauthorized code, and, at 455, no further wireless communication may occur.

Where the ophthalmic lens may respond with the authorized or paired code at 405, the interrogation may pair the two devices prior to the transmission of the smartphone data. In such event, at 410, the smartphone may wirelessly transmit the event data to a receiver in the ophthalmic lens, for example, those illustrated in FIG. 1. At 415, the transmission may trigger an activation of the ophthalmic lens, which may include, for example, a vibration or light notification.

In some exemplary embodiments, the ophthalmic lens may be capable of receiving data but may not transmit a response to the smartphone. In some such embodiments, the activation may terminate based on a variety of actions. At 420, the smartphone event may discontinue. Accordingly, the event transmission may discontinue, which may cause the activation to terminate at 425.

Alternately, the ophthalmic lens may further comprise a sensor control mechanism, which the ophthalmic lens may recognize when a user acknowledges the activation at 430. For example, the sensor control may comprise a blink detection mechanism, wherein a user may control the activation through timed blinking or blink patterns. In such exemplary embodiments, an acknowledgment at 430 may terminate the activation at 435. An ophthalmic lens with sensor control may be preferable where the smartphone events include more than notification of an incoming phone call, which inherently has a time limit.

Figure 5:
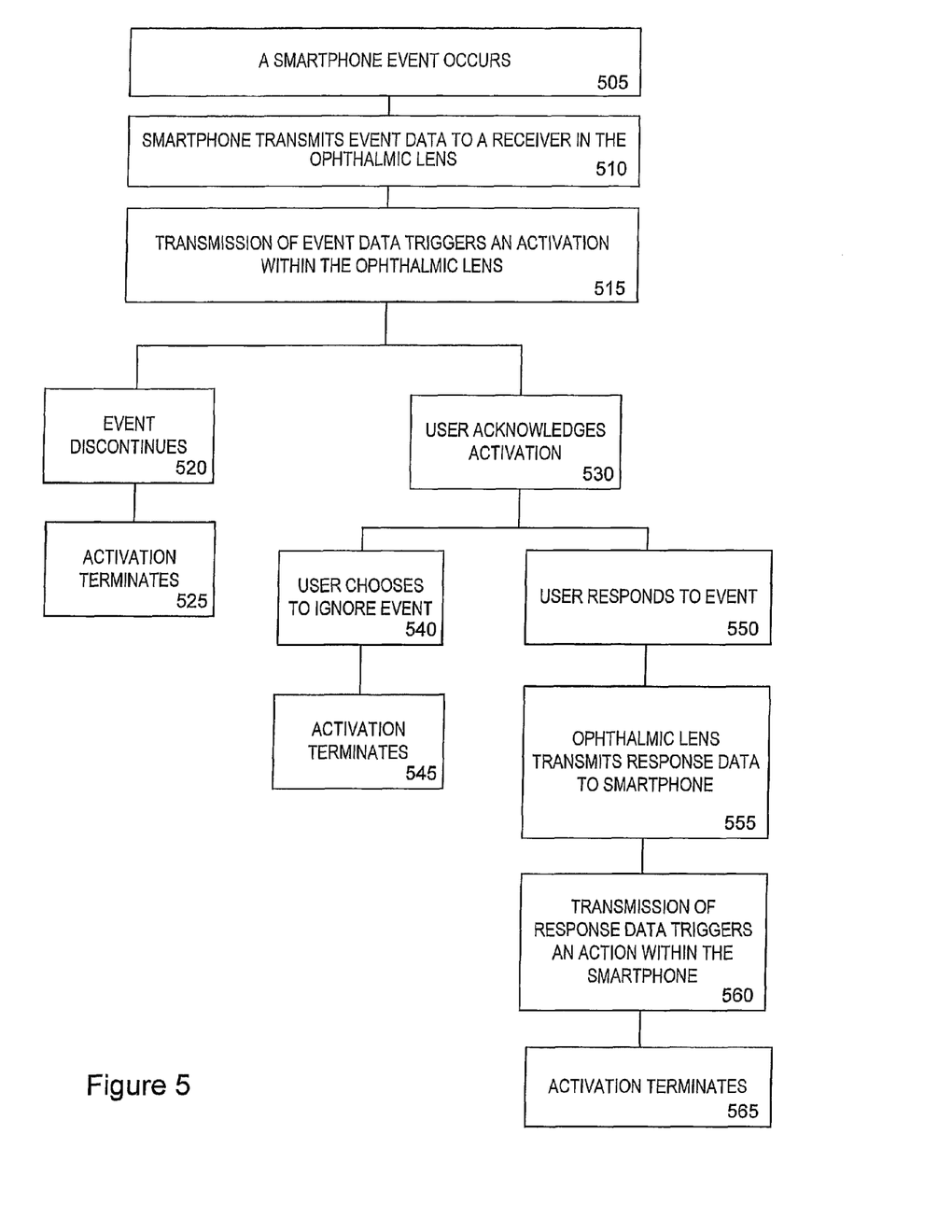
FIG. 5 illustrates an exemplary process flowchart for smartphone event notification, wherein the energizable ophthalmic lens may be capable of wirelessly receiving event data from a smartphone and wirelessly transmitting response data to the smartphone.

Referring to FIG. 5, an alternate flowchart is illustrated. In some alternate exemplary embodiments, the ophthalmic lens may be capable of transmitting control data to the smartphone in response to a specific smartphone event. The steps at 505-525 may be similar to the steps at 400-425 in FIG. 4. At 505, a smartphone event may occur, and at 510, the smartphone may transmit that data to a receiver in the ophthalmic lens.

Though not illustrated, the verification steps at 402, 405, 450 in FIG. 4, may occur in the exemplary embodiments illustrated in FIG. 5. Similarly, where the verification fails, the wireless communication may terminate prior to transmission of smartphone event data. Where the verification succeeds, at 515, the transmission may trigger activation in the ophthalmic lens. With some smartphone events, at 520, the event may discontinue, which may terminate the activation at 525.

Similar to the step at 430 in FIG. 4, a user may acknowledge the activation, for example, through a blink detection mechanism. Unlike FIG. 4, though, in some exemplary embodiments, the acknowledgement may control more than the activation within the ophthalmic lens. In some exemplary embodiments, at 530, the user may acknowledge the activation and choose to ignore the event at 540, which may terminate activation 545. The step at 540 may be internal to the ophthalmic lens and may not require communication with the smartphone.

Alternately, at 550, the user may respond to the event, wherein the response affects the smartphone. In such exemplary embodiments, the ophthalmic lens may wirelessly interact with the smartphone in response to the event. At 555, a transmitter in the ophthalmic lens may transmit the response data to the smartphone. At 560, the transmission of the response data may trigger an action in the smartphone. At 565, the activation of the ophthalmic lens may terminate. In some exemplary embodiments, the activation may terminate at 565 when the ophthalmic lens transmits the response data.

In other exemplary embodiments, additional steps may occur to terminate activation. For example, the termination at 565 may occur after the smartphone confirms reception of the response data. Alternately, the termination at 565 may occur after the response data triggers the action in the smartphone.

As an illustrative example, the response sensor may comprise a blink detection mechanism, and the smartphone event may comprise an incoming phone call. An incoming call may trigger the ophthalmic lens to vibrate, and the user may respond by ignoring the call, silencing the ring, sending the call to voicemail, or answering the call on speakerphone. Ignoring the call may terminate the activation but may not affect the smartphone, whereas the other three responses may be transmitted to the smartphone. Each response may be associated with a specific blink pattern.

Figure 6:
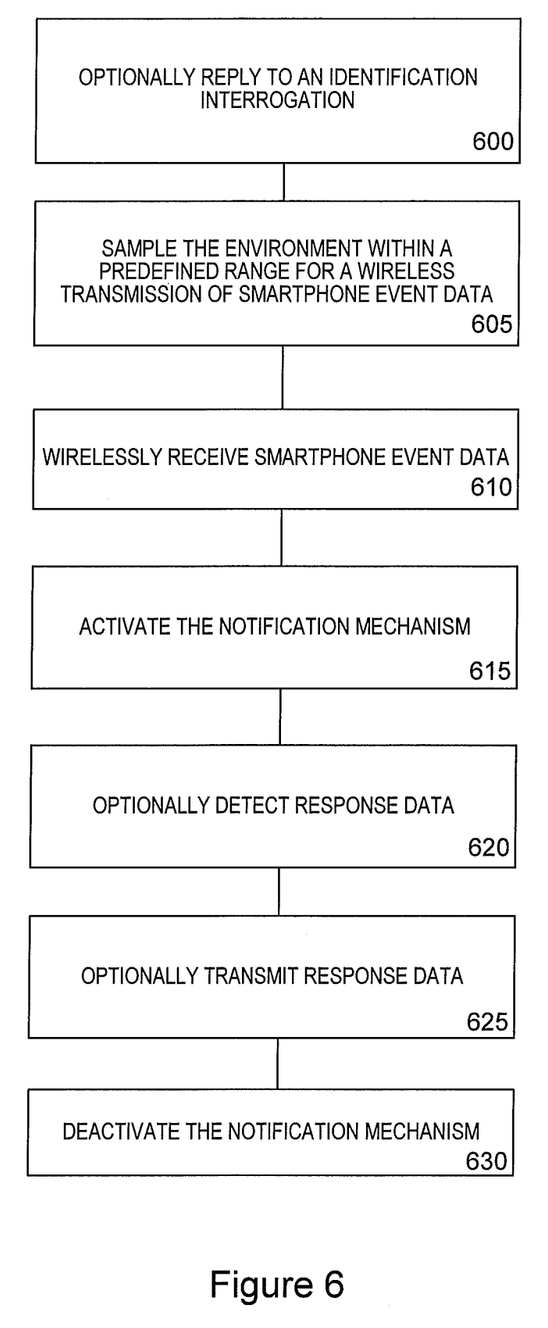
FIG. 6 illustrates exemplary method steps for notifying a user of a smartphone event through use of an energizable ophthalmic lens.

Referring to FIG. 6, an exemplary flowchart with method steps for notifying a user of a smartphone event through use of an energizable ophthalmic lens is illustrated. In some exemplary embodiments, at 600, the ophthalmic lens may receive an authorization or identification interrogation, for example, as described with respect to FIGS. 2 and 3, from a smartphone. The interrogation may allow for a verification step prior to the transmission of the smartphone event data.

In some exemplary embodiments, at 605, the ophthalmic lens may sample the environment for the wireless transmission of smartphone event data, as illustrated, for example, in FIG. 2. The environment may be limited to a specific range. Limiting the sampling range may conserve power. Some exemplary embodiments may initiate the sampling at 605 when a serial code is authenticated in response to the interrogation, at 600. The sampling may be terminated in some embodiments after a specified time after the interrogation, at 600. Such embodiments may conserve power where the authentication may be unsuccessful.

At 610, the ophthalmic lens may receive the smartphone event data. In response to the smartphone event data, at 615, the notification mechanism may be activated. As described and illustrated in FIG. 2, the notification may comprise, for example, visible light or vibration.

In some exemplary embodiments, at 620, the ophthalmic lens may detect a response to the notification from the user, wherein the response prompts a predefined action. In some aspects, the response data may prompt internal action. For example, at 630, the response data may deactivate the notification mechanism. The deactivation at 630 may reinitiate the sampling at 605.

Alternately, the response data may prompt an action by the smartphone. In some such embodiments, at 625, the ophthalmic lens may wirelessly transmit the response data to the smartphone. The transmission at 625 may include or may combine with an identification code exchange between the smartphone and the ophthalmic lens, similar to the step at 600. In other aspects, wireless communication may be continuous throughout the duration of the smartphone event notification, wherein a verification step may not be necessary to ensure communication between the intended smartphone and ophthalmic lens.

The transmission of the response data at 625 may trigger an action in the smartphone. For example, where the smartphone event comprises an incoming phone call, the response data may prompt the smartphone to silence the ring or to send the call to voicemail. The deactivation of the notification mechanism at 630 may occur when the response data is detects at 620 or when the response data is detected at 625.

Figure 7:
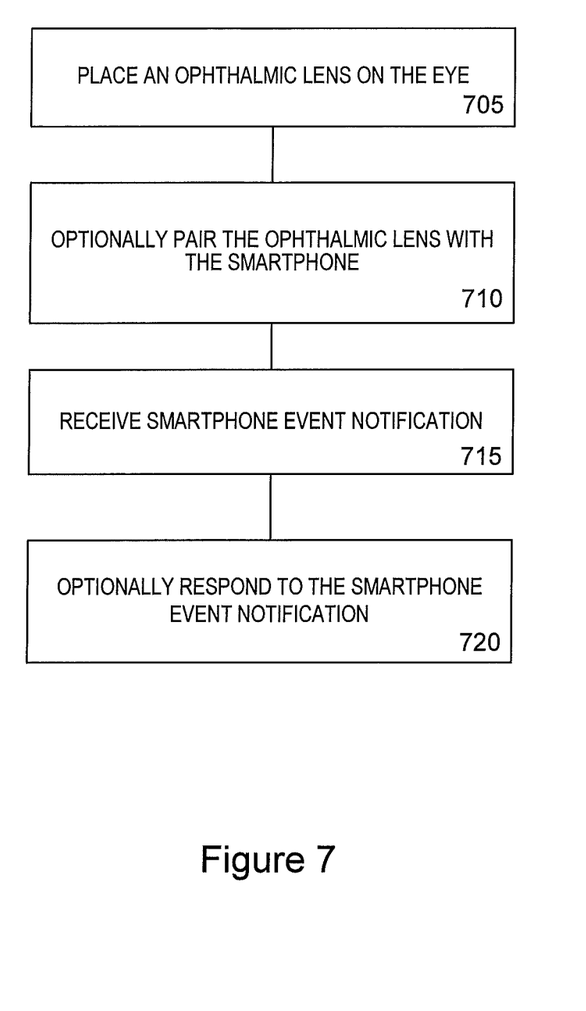
FIG. 7 illustrates exemplary method steps for using an energizable ophthalmic lens with a smartphone event indicator.

Referring to FIG. 7, exemplary method steps for using an ophthalmic lens with a smartphone notification mechanism is illustrated. At 705, the ophthalmic lens may be placed on an eye. In some exemplary embodiments, at 710, the ophthalmic lens may be synchronized with the designated smartphone. The synchronization at 710 may occur prior to use. For example, an ophthalmic lens may be preprogrammed to be synchronized with a particular smartphone wireless profile. In other exemplary embodiments, the ophthalmic lens may be synchronized with the smartphone, while the ophthalmic lens is located on the eye and the smartphone is located in proximity to the ophthalmic lens. In some such embodiments, a user may operate a software application on the smartphone, wherein the software application is capable of recognizing the presence and wireless profile of the ophthalmic lens.

At 715, a user may receive notification of the smartphone event. The notification may include a visible light indication or a vibration alert, such as those described with respect to FIGS. 1-3. In some exemplary embodiments, at 720, the user may optionally respond to the smartphone event notification. Some such aspects may allow the user to deactivate the notification, wherein the response does not require a wireless transmission of the response to the smartphone. In some aspects, the user may be capable of controlling or triggering an action in the smartphone, including, for example, silencing the ringtone or acknowledging a calendar event.

Materials for Insert Based Ophthalmic Lenses

In some exemplary embodiments, a lens type may be a lens that includes a silicone-containing component. A "silicone-containing component" is one that contains at least one [—Si—O—] unit in a monomer, macromer, or prepolymer. Preferably, the total Si and attached O are present in the silicone-containing component in an amount greater than about twenty (20) weight percent, and more preferably greater than thirty (30) weight percent of the total molecular weight of the silicone-containing component. Useful silicone-containing components preferably comprise polymerizable functional groups such as acrylate, methacrylate, acrylamide, methacrylamide, vinyl, N-vinyl lactam, N-vinylamide, and styryl functional groups.

In some exemplary embodiments, the ophthalmic lens skirt, which sometimes may be called an insert encapsulating layer, that surrounds the insert may be comprised of standard hydrogel lens formulations. Exemplary materials with characteristics that may provide an acceptable match to numerous insert materials may include the Narafilcon family; including Narafilcon A and Narafilcon B. Alternately, the Etafilcon family; including Etafilcon A may represent good exemplary material choices. A more technically inclusive discussion follows on the nature of materials consistent with the art herein, but it may be clear that any materials that may form an acceptable enclosure or partial enclosure of the sealed and encapsulated inserts are consistent and included.

Suitable silicone containing components include compounds of Formula I wherein $R^1$ is independently selected from monovalent reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof; and monovalent siloxane chains comprising 1-100 Si—O repeat units which may further comprise functionality selected from alkyl, hydroxy, amino, oxa, carboxy, alkyl carboxy, alkoxy, amido, carbamate, halogen or combinations thereof;

wherein b=0 to 500, where it is understood that when b is other than 0, b is a distribution having a mode equal to a stated value;

wherein at least one $R^1$ comprises a monovalent reactive group, and in some embodiments between one and 3 $R^1$ comprise monovalent reactive groups.

As used herein "monovalent reactive groups" are groups that can undergo free radical and/or cationic polymerization. Non-limiting examples of free radical reactive groups include (meth)acrylates, styryls, vinyls, vinyl ethers, $C_{1-6}$alkyl(meth)acrylates, (meth)acrylamides, $C_{1-6}$alkyl(meth)acrylamides, N-vinyllactams, N-vinylamides, $C_{2-12}$alkenyls, $C_{2-12}$alkenylphenyls, $C_{2-12}$alkenylnaphthyls, $C_{2-6}$alkenylphenyl$C_{1-6}$alkyls, O-vinylcarbamates and O-vinylcarbonates. Non-limiting examples of cationic reactive groups include vinyl ethers or epoxide groups and mixtures thereof. In one embodiment the free radical reactive groups comprises (meth)acrylate, acryloxy, (meth)acrylamide, and mixtures thereof.

Suitable monovalent alkyl and aryl groups include unsubstituted monovalent $C_1$ to $C_{16}$alkyl groups, $C_6$-$C_{14}$ aryl groups, such as substituted and unsubstituted methyl, ethyl, propyl, butyl, 2-hydroxypropyl, propoxypropyl, polyethyleneoxypropyl, combinations thereof, and the like.

In one exemplary embodiment, b is zero, one $R^1$ is a monovalent reactive group, and at least 3 $R^1$ are selected from monovalent alkyl groups having one to sixteen (16) carbon atoms, and in another embodiment from monovalent alkyl groups having one to six (6) carbon atoms. Non-limiting examples of silicone components of this embodiment include 2-methyl-,2-hydroxy-3-[3-[1,3,3,3-tetramethyl-1-[(trimethylsilyl)oxy]disiloxanyl]propoxy]propyl ester ("SiGMA"), 2-hydroxy-3-methacryloxypropyloxypropyl-tris(trimethylsiloxy)silane, 3-methacryloxypropyltris(trimethylsiloxy)silane ("TRIS"), 3-methacryloxypropylbis(trimethylsiloxy)methylsilane and 3-methacryloxypropylpentamethyl disiloxane.

In another exemplary embodiment, b is 2 to 20, 3 to 15 or in some exemplary embodiments 3 to 10; at least one terminal $R^1$ comprises a monovalent reactive group and the remaining $R^1$ are selected from monovalent alkyl groups having 1 to 16 carbon atoms, and in another embodiment from monovalent alkyl groups having 1 to 6 carbon atoms. In yet another exemplary embodiment, b is 3 to 15, one terminal $R^1$ comprises a monovalent reactive group, the other terminal $R^1$ comprises a monovalent alkyl group having 1 to 6 carbon atoms and the remaining $R^1$ comprise monovalent alkyl group having 1 to 3 carbon atoms. Non-limiting examples of silicone components of this embodiment include (mono-(2-hydroxy-3-methacryloxypropyl)-propyl ether terminated polydimethylsiloxane (400-1000 MW)) ("OH-mPDMS"), monomethacryloxypropyl terminated mono-n-butyl terminated polydimethylsiloxanes (800-1000 MW), ("mPDMS").

In another exemplary embodiment, b is 5 to 400 or from 10 to 300, both terminal $R^1$ comprise monovalent reactive groups and the remaining $R^1$ are independently selected from monovalent alkyl groups having 1 to 18 carbon atoms which may have ether linkages between carbon atoms and may further comprise halogen.

In one exemplary embodiment, where a silicone hydrogel lens is desired, the lens of the present invention will be made from a reactive mixture comprising at least about 20 and preferably between about 20 and 70 weight percent silicone containing components based on total weight of reactive monomer components from which the polymer is made.

In another exemplary embodiment, one to four $R^1$ comprises a vinyl carbonate or carbamate of the formula:

Formula II wherein, Y denotes O—, S— or NH—;
R denotes, hydrogen or methyl; d is 1, 2, 3, or 4; and q is 0 or 1.

The silicone-containing vinyl carbonate or vinyl carbamate monomers specifically include: 1,3-bis[4-(vinyloxycarbonyloxy)but-1-yl]tetramethyl-disiloxane; 3-(vinyloxycarbonylthio)propyl-[tris(trimethylsiloxy)silane]; 3-[tris(trimethylsiloxy)silyl]propyl allyl carbamate; 3-[tris(trimethylsiloxy)silyl]propyl vinyl carbamate; trimethylsilylethyl vinyl carbonate; trimethylsilylmethyl vinyl carbonate, and where biomedical devices with modulus below about 200 are desired, only one $R^1$ shall comprise a monovalent reactive group and no more than two of the remaining $R^1$ groups will comprise monovalent siloxane groups.

Another class of silicone-containing components includes polyurethane macromers of the following formulae:

Formulae IV-VI wherein:

D denotes an alkyl diradical, an alkyl cycloalkyl diradical, a cycloalkyl diradical, an aryl diradical or an alkylaryl diradical having 6 to 30 carbon atoms, G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;

* denotes a urethane or ureido linkage;

$a$ is at least 1;

A denotes a divalent polymeric radical of formula:

Formula VII $R^{11}$ independently denotes an alkyl or fluoro-substituted alkyl group having 1 to 10 carbon atoms that may contain ether linkages between carbon atoms; y is at least 1; and p provides a moiety weight of 400 to 10,000; each of E and $E^1$ independently denotes a polymerizable unsaturated organic radical represented by formula:

Formula VIII wherein: $R^{12}$ is hydrogen or methyl; $R^{13}$ is hydrogen, an alkyl radical having 1 to 6 carbon atoms, or a —CO—Y—$R^{15}$ radical wherein Y is —O—, Y—S— or —NH—; $R^{14}$ is a divalent radical having 1 to 12 carbon atoms; X denotes —CO— or —OCO—; Z denotes —O— or —NH—; Ar denotes an aromatic radical having 6 to 30 carbon atoms; w is 0 to 6; x is 0 or 1; y is 0 or 1; and z is 0 or 1.

A preferred silicone-containing component is a polyurethane macromer represented by the following formula:

Formula IX wherein $R^{16}$ is a diradical of a diisocyanate after removal of the isocyanate group, such as the diradical of isophorone diisocyanate. Another suitable silicone containing macromer is compound of formula X (in which x+y is a number in the range of 10 to 30) formed by the reaction of fluoroether, hydroxy-terminated polydimethylsiloxane, isophorone diisocyanate and isocyanatoethylmethacrylate.

Other silicone containing components suitable for use in the present invention include macromers containing polysiloxane, polyalkylene ether, diisocyanate, polyfluorinated hydrocarbon, polyfluorinated ether and polysaccharide groups; polysiloxanes with a polar fluorinated graft or side group having a hydrogen atom attached to a terminal difluoro-substituted carbon atom; hydrophilic siloxanyl methacrylates containing ether and siloxanyl linkanges and crosslinkable monomers containing polyether and polysiloxanyl groups. Any of the foregoing polysiloxanes may also be used as the silicone-containing component in this invention.

The present invention, as described above and as further defined by the claims below, provides an energizable ophthalmic lens with a smartphone event indicator, wherein the ophthalmic lens may wirelessly receive smartphone event data from a smartphone. In some aspects, the energizable ophthalmic lens may comprise energizable components encapsulated by the soft biocompatible portion. In other aspects, the ophthalmic lens may comprise a media insert, wherein the energizable components may be encapsulated in the media insert, and the media insert may be included in ophthalmic lens.

In some exemplary embodiments, an ophthalmic lens may include a verification code or mechanism, wherein a pairing with a specified smartphone may limit wireless communication to communication between the two specified devices.

Formula X

The receipt of smartphone event data may activate an indicator in the ophthalmic lens. In some exemplary embodiments, the ophthalmic lens may allow for user response to the notification of the smartphone event. The response may trigger an internal action within the ophthalmic lens, or the ophthalmic lens may transmit response data to the smartphone, triggering an action in the smartphone.

What is claimed is:

1. An energizable ophthalmic lens for notifying a user of a smartphone event, the energizable ophthalmic lens comprising:
   a notification mechanism for notifying the user of the smartphone event, wherein the notification mechanism is configured for providing a first functionality to the energizable ophthalmic lens;
   a receiver for wirelessly receiving smartphone event data from a predefined source smartphone, wherein the receiver is in electrical communication with the notification mechanism;
   conductive traces for electrically connecting the notification mechanism and the receiver; and
   a soft lens portion for encapsulating the notification mechanism and the receiver.

2. The energizable ophthalmic lens of claim 1 further comprising:
   a power source, wherein the conductive traces are configured for electrically connecting the power source with the notification mechanism; and
   a processor in electrical communication with the power source, the notification mechanism, and the receiver, wherein the processor is configured for controlling the notification mechanism and the receiver.

3. The energizable ophthalmic lens of claim 1, wherein the notification mechanism comprises a light source, wherein the light source is visible to the user when the notification mechanism is activated.

4. The energizable ophthalmic lens of claim 1, wherein the notification mechanism comprises a vibration device for providing mechanical movement, wherein the mechanical movement is perceptible by the user.

5. The energizable ophthalmic lens of claim 1, wherein the notification mechanism comprises a sound generating device, wherein the sound generating device is configured for producing an auditory effect perceptible to the user.

6. The energizable ophthalmic lens of claim 1 further comprising a serial authorization code, wherein the serial authorization code is configured for identifying the energizable ophthalmic lens.

7. The energizable ophthalmic lens of claim 1 further comprising a sensor in electrical communication with the processor, wherein the sensor is configured for detecting a user response, and wherein the processor is configured for generating user response data based on the user response.

8. The energizable ophthalmic lens of claim 2, wherein the predefined source smartphone comprises a transmission adapter, and wherein the transmission adapter is configured for allowing the predefined source smartphone to wirelessly transmit the smartphone event data to the receiver.

9. The energizable ophthalmic lens of claim 2 further comprising a media insert for encapsulating the notification mechanism, the receiver, the power source, the processor, and the conductive traces, wherein the soft lens portion is configured for encapsulating the media insert.

10. The energizable ophthalmic lens of claim 2, wherein the processor is configured for discerning a plurality of smartphone event types originating from the predefined source of the smartphone event data, wherein the notification mechanism comprises a plurality of activation settings, and wherein each smartphone event type triggers a predefined activation setting.

11. The energizable ophthalmic lens of claim 4, wherein the vibration device comprises a piezoelectric mechanism.

12. The energizable ophthalmic lens of claim 5, wherein the auditory effect is perceptible to the user through bone conduction.

13. The energizable ophthalmic lens of claim 6 further comprising a verification transmitter for wirelessly transmitting at least a portion of the serial authorization code to the predefined source smartphone.

14. The energizable ophthalmic lens of claim 7, further comprising a transmitter in electrical communication with the processor, wherein the transmitter is configured for transmitting response data to the predefined source smartphone, and wherein the transmitting of response data is for triggering a predefined action in the predefined source smartphone.

15. The energizable ophthalmic lens of claim 7, wherein the sensor comprises a blink detection mechanism, and wherein the user response comprises a predefined blinking pattern.

16. The energizable ophthalmic lens of claim 7, wherein the response data is configured for terminating the notification.

17. The energizable ophthalmic lens of claim 8, wherein the receiver is configured for receiving the smartphone event data from the predefined source smartphone through an infrared transmission, wherein the infrared transmission comprises a predefined patterned pulse of a predefined infrared wavelength, and wherein the transmission adapter is configured for transmitting the infrared transmission.

18. The energizable ophthalmic lens of claim 9, wherein the media insert further comprises an energizable element in electrical communication with the power source and the processor, wherein the energizable element is configured for providing a second functionality to the ophthalmic lens.

19. The energizable ophthalmic lens of claim 13, wherein the verification transmitter comprises a radio frequency identification transmitter.

20. The energizable ophthalmic lens of claim 18, wherein the energizable element comprises a variable optic mechanism, wherein the second functionality comprises vision correction.

* * * * *